Patented Feb. 17, 1925.

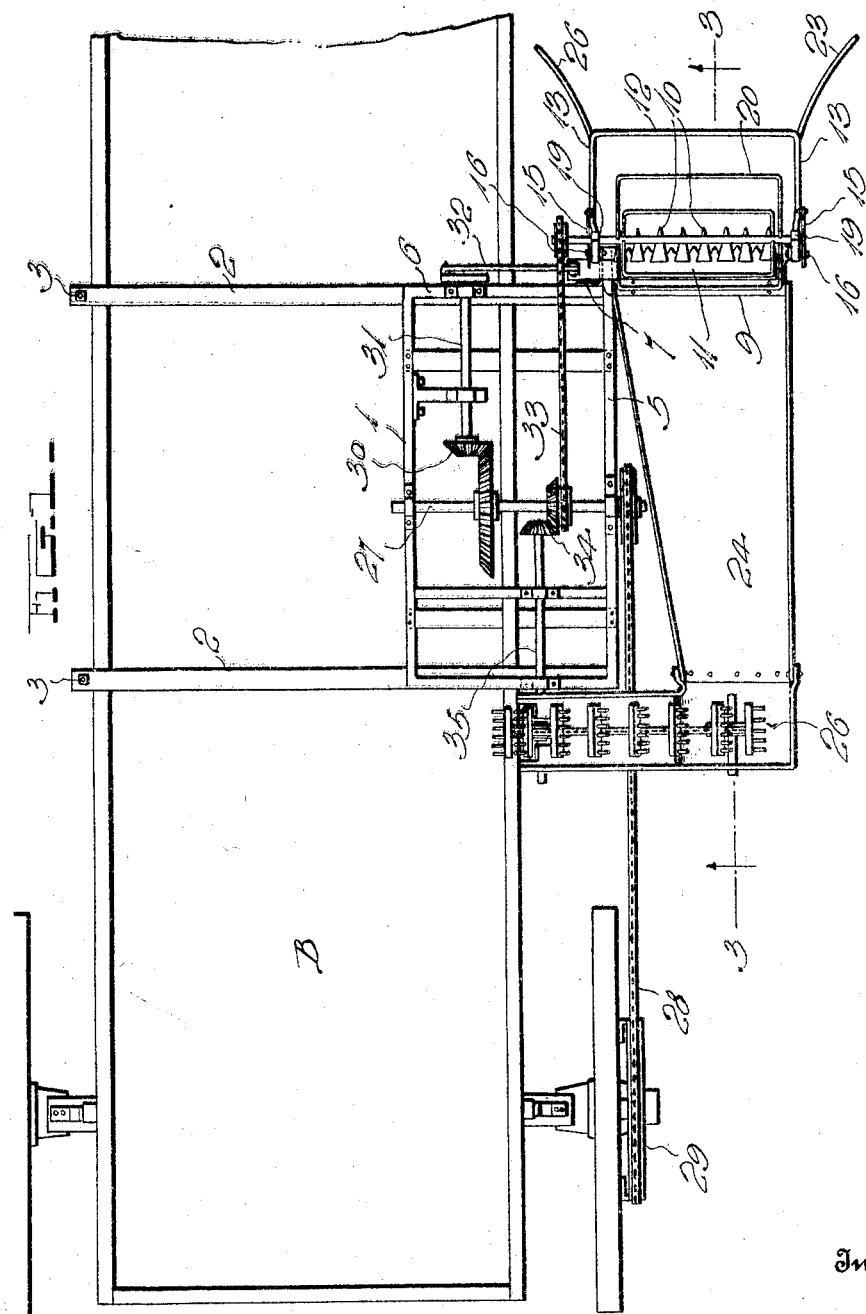

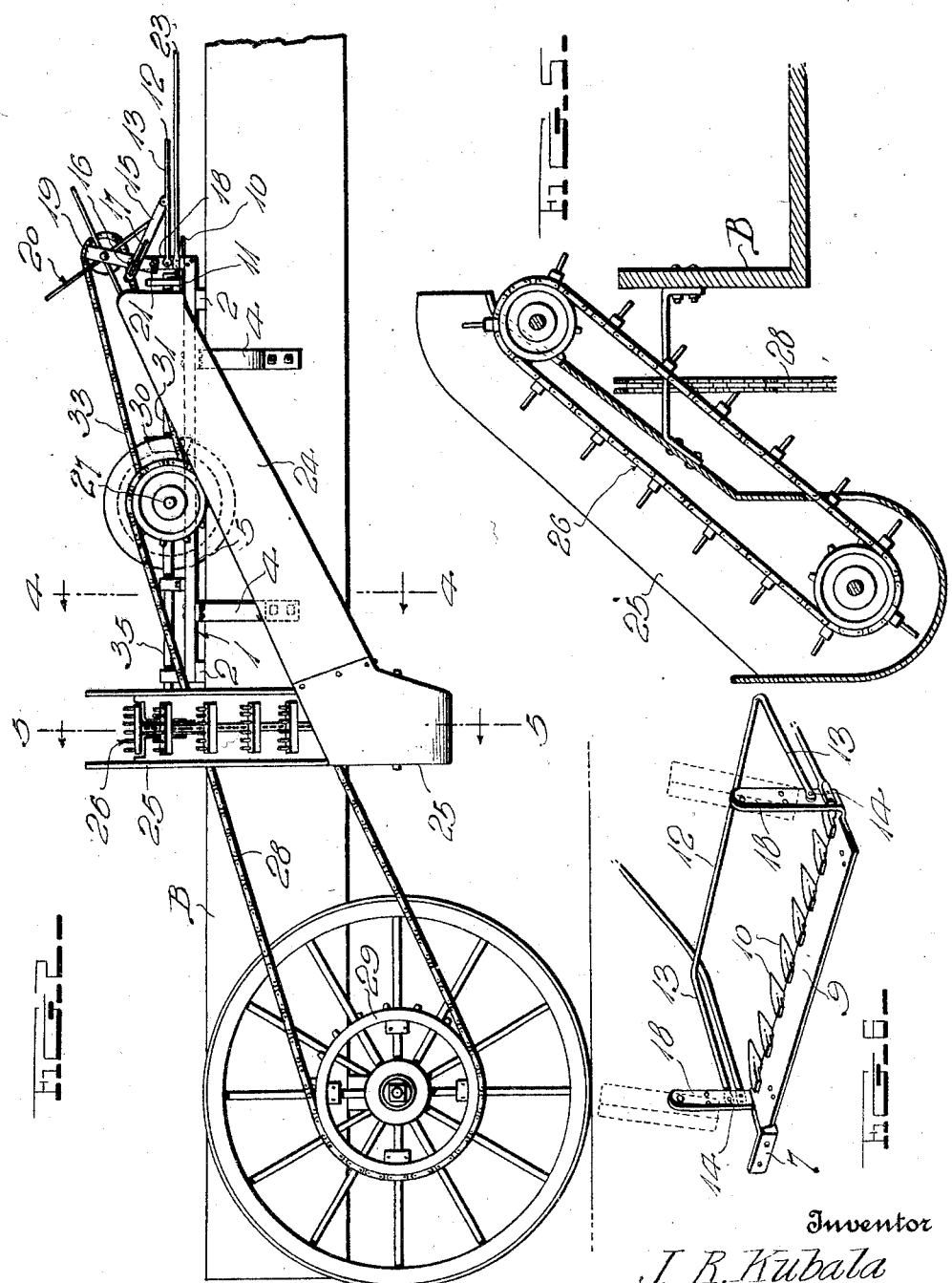

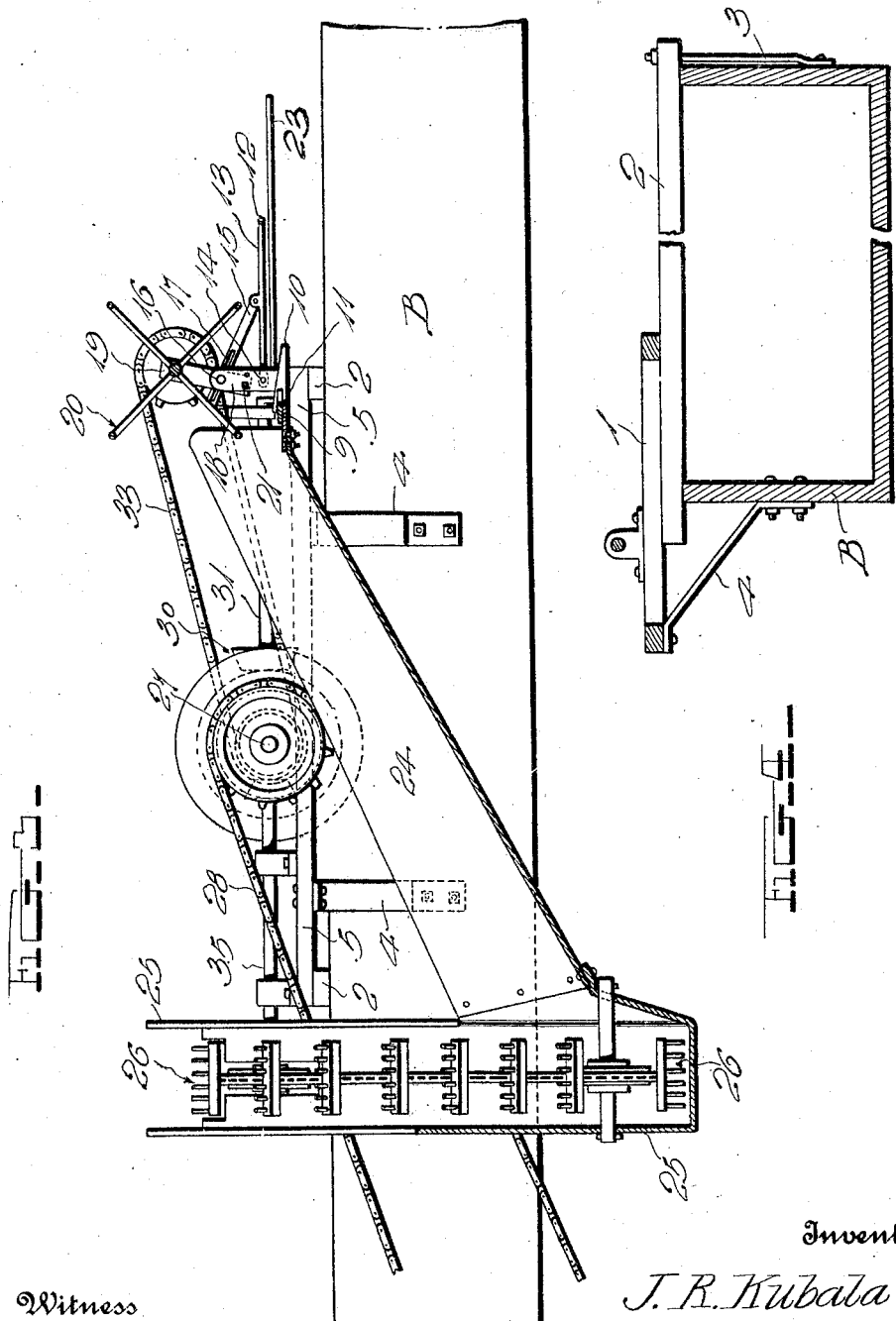

1,526,798

UNITED STATES PATENT OFFICE.

JAMES RUDOLPH KUBALA, OF YOAKUM, TEXAS.

GRAIN-HEADING MACHINE.

Application filed September 24, 1923. Serial No. 664,583.

*To all whom it may concern:*

Be it known that I, JAMES R. KUBALA, a citizen of the United States, residing at Yoakum, in the county of De Witt and State of Texas, have invented certain new and useful Improvements in Grain-Heading Machines; and I do declare the following to be a full, clear, and exact description of the invention, such as will enable others skilled in the art to which it appertains to make and use the same.

My invention relates to improvements in grain heading machines and the present embodiment is intended principally for cane topping although it could be used for other purposes.

One object of the invention is to provide a simply constructed and inexpensive, yet a highly efficient and reliable device which may be attached to an ordinary farm wagon for topping the grain and depositing the tops into the wagon bed.

In carrying out the above end, I employ a reciprocating cutter for severing the heads of the grain from the stalks, provide a guide to depress the heads and properly present them to said cutter, and employ a reel for throwing the severed heads rearwardly into conveying mechanism which discharges them into the wagon bed or other suitable receiver; and further objects of my invention are to mount said guide and said reel in a novel manner so as to permit adjustment thereof according to the size of the grain to be topped.

With the foregoing in view, the invention resides in the novel construction and arrangement of parts hereinafter described and claimed, the descriptive matter being supplemented by the accompanying drawings which form a part of this application.

Figure 1 is a top plan view of my invention attached to a farm wagon.

Figure 2 is a side elevation.

Fig. 3 is a longitudinal section on the plane designated by line 3—3 of Fig. 1.

Figs. 4 and 5 are vertical transverse sections on the planes indicated by the lines 4—4 and 5—5 of Fig. 2.

Fig. 6 is a detail perspective view showing more clearly the manner of mounting the guide and reel above mentioned.

In carrying out my invention, I prefer to construct the same in the form of an attachment for farm wagons, although a number of the novel features of construction hereinafter described, could well be incorporated in a complete cane topping machine, constructed as a whole at the factory. When the improvements are embodied in the form of a wagon attachment, I employ a rectangular frame 1 disposed horizontally and provided with means for securing it on one side of a wagon bed B, said frame being shown as securely mounted on one end of two transverse sleepers 2, said sleepers being adapted to rest on the sides of the wagon bed. The ends of the sleepers 2, remote from the frame 1 may be secured to the wagon bed in any preferred manner, but in most instances I contemplate the use of vertical bolts 3 secured at one end to the side of the bed and passed at their other ends through said sleepers. Adjacent the other ends of the sleepers 2, the frame 1 may well be attached to the wagon bed by braces 4.

As shown, the outer side bar 5 of the frame 1 projects forwardly beyond the front end bar 6 thereof, and an L-shaped bracket 7 is secured in the angle between said projecting end of the bar 5 and said bar 6. This bracket serves to brace the frame and also acts as carrying means for the topping mechanism. This mechanism by preference comprises a fixed base bar 9 having teeth 10, and a suitable sickle bar 11. The bar 9 extends laterally from the front end of the frame 1 and is shown integrally joined at its inner end to the bracket 7, said bar carrying the sickle bar 11 in any well known manner.

For depressing the heads of the grain and properly presenting them to the cutting mechanism, I provide a guide bar 12 positioned in advance of the sickle bar 11 and mounted for vertical adjustment. In the present form of the machine, the bar 12 is provided with rearwardly extending arms 13 which are pivotally mounted at 14 for vertical swinging. Suitable means such as the slotted links 15 are provided for holding the arms 13 in any position to which they may be swung, clamping bolts 16 being passed through the slots 17 of said links. I prefer to pivot the arms 13 to a pair of vertical standards 18 which rise rigidly from the ends of the bar 9 and may well be integral with said bar, and said standards 18 may also carry the clamping bolts 17, as well as additional vertical arms 19 carrying a reel 20.

The arms 19 above mentioned are mounted for forward and rearward swinging in order that the reel may be adjusted to produce the best results, and I prefer that the clamping bolts 16 shall serve also as the pivots for said arms 19, thus simplifying the machine and at the same time permitting these bolts to clamp the links 15 as well as the arms 19 in adjusted position. In addition to the holding action of the bolts 16 however, bolts 21 are preferably provided to adjustably secure the lower ends of the arms 19 to the standards 18, said bolts being insertable through different openings according to the position of the reel, as will be clear from Figs. 3 and 6.

The bar 12 when properly adjusted presents the tops of the grain to the cutter in the most effective manner and said tops are preferably guided to said bar by a pair of forwardly diverging feelers 23. As the heads are cut, the reel 20 throws such heads rearwardly into a rearwardly declining chute 24, and the latter discharges into a relatively steep trough 25, in which is located an endless conveyor 26 which will elevate the tops and discharge them into the wagon bed B. The chute 24 and trough 25 may be mounted in any adequate manner and the front end of said chute is by preference secured to the bar 9 as illustrated in Fig. 3.

The frame 1 carries a transverse drive shaft 27 which as shown, is driven by a chain 28 and sprocket 29 from one wheel of the wagon, said shaft being suitably geared at 30 to a longitudinal shaft 31 which operates the pitman 32 for the sickle bar 11. A chain 33 drives the reel 20 from the shaft 27, and by means of gearing 34 and the shaft 35, the conveyor 26 is operated. The driving mechanism disclosed is preferably followed, but analagous arrangements might well be substituted if desired. In all instances, the sickle bar and reel will sever the grain heads and deposit them in the chute 24, and the conveyor 26 will then carry them into the wagon bed B.

The device is of rather simple and inexpensive nature, yet will be highly efficient and in every way desirable, particular attention being laid upon the adjustability of the reel and the guide bar 12, upon the general arrangement of the frame and associated parts, and upon the ease with which the device may be attached to or removed from an ordinary farm wagon.

I claim:

1. A heading machine comprising a portable frame, a transverse cutter mounted on said frame, a vertical standard at each end of said cutter, upstanding arms pivoted to said standards for forward and rearward swinging, a reel mounted on said arms, a transverse horizontal bar in advance of said cutter, arms extending rearwardly from said bar and pivoted to said standards, and common means for holding said first and last named arms in adjusted position.

2. In a topping machine, a portable frame, a transverse cutter mounted on said frame, a vertical standard at each end of said cutter, arms pivoted to and extending forwardly from the lower ends of said standards, a transverse head depressing bar carried by said arms, slotted links pivoted to and inclining upwardly and rearwardly from said arms to hold them in adjusted position, clamping bolts passing through the slots of said links and through said standards, a reel above said cutter, and a pair of vertical arms carrying said reel and mounted on said clamping bolts.

3. A topping machine comprising a horizontal frame, means for securing one end of said frame on a wagon body, its other end being adapted to project laterally from such body, said frame including a front end bar and an outer side bar, a rigid bracket secured in the angle between said side and end bars, a transverse horizontal bar extending laterally outward from said side bar and carried rigidly by said bracket, and heading means carried by said transverse horizontal bar.

In testimony whereof I have hereunto affixed my signature.

JAMES RUDOLPH KUBALA.